(No Model.) 4 Sheets—Sheet 1.
G. BEEKMAN.
PICKER ACTUATING MECHANISM FOR COTTON HARVESTERS.
No. 501,671. Patented July 18, 1893.
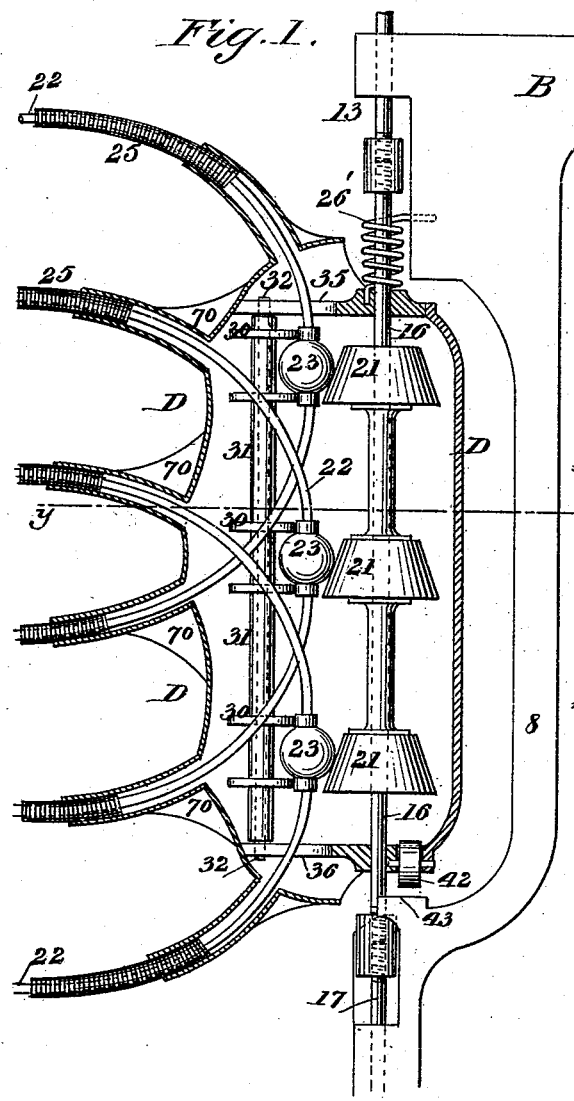
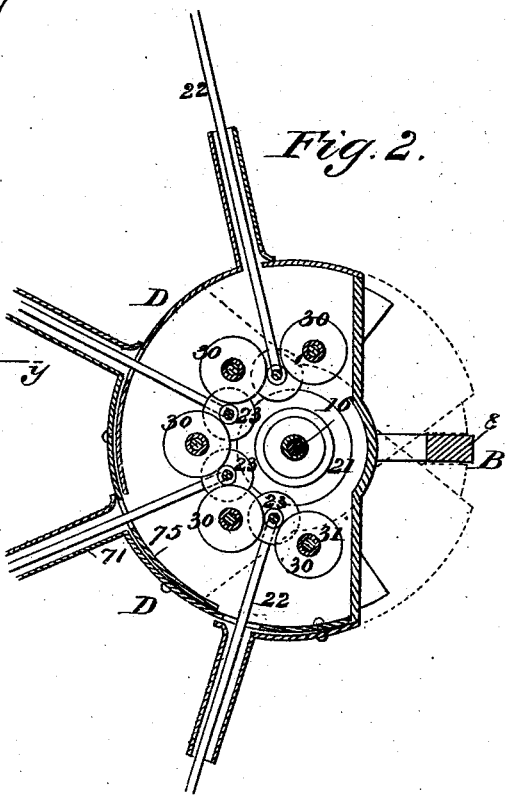
WITNESSES:
Eugene Lucas
C. J. McCoy
INVENTOR
Gerard Beekman
BY
Henry F. Parker
ATTORNEY (No Model.)  4 Sheets—Sheet 2.

G. BEEKMAN.
PICKER ACTUATING MECHANISM FOR COTTON HARVESTERS.

No. 501,671. Patented July 18, 1893.

WITNESSES:
Eugene Lucas
A. J. McCoy

INVENTOR
Gerard Beekman
BY
Henry F. Parker
ATTORNEY (No Model.) 4 Sheets—Sheet 3.

G. BEEKMAN.
PICKER ACTUATING MECHANISM FOR COTTON HARVESTERS.

No. 501,671. Patented July 18, 1893.

WITNESSES:
Eugene Lucas
A. J. McCoy

INVENTOR
Gerard Beekman
BY
Henry F. Parker
ATTORNEY (No Model.)  4 Sheets—Sheet 4.
G. BEEKMAN.
PICKER ACTUATING MECHANISM FOR COTTON HARVESTERS.
No. 501,671.  Patented July 18, 1893.
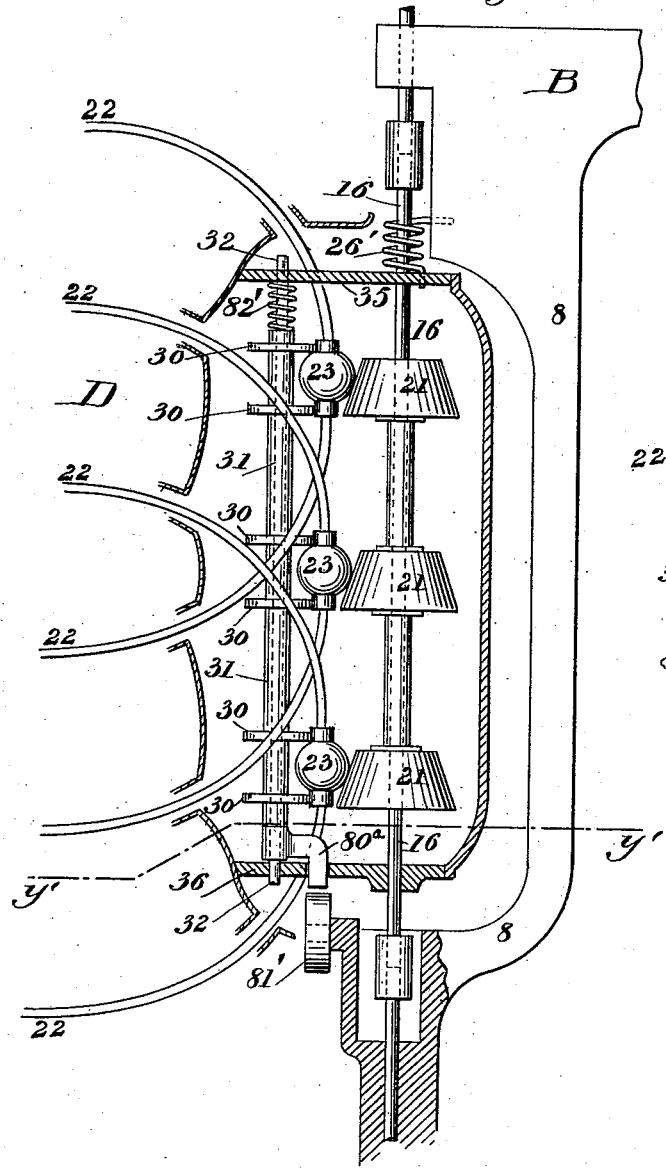
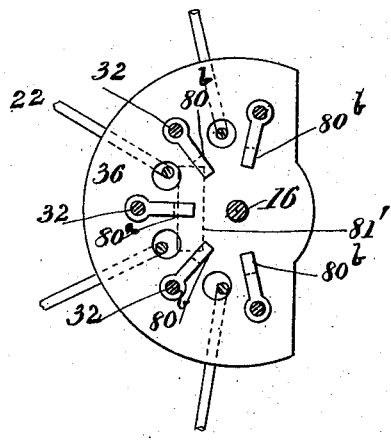
WITNESSES:
Eugene Lucas
A. J. McCoy
INVENTOR
Gerard Beekman
BY
Henry F. Parker
ATTORNEY

UNITED STATES PATENT OFFICE.

GERARD BEEKMAN, OF NEW YORK, N. Y.

PICKER-ACTUATING MECHANISM FOR COTTON-HARVESTERS.

SPECIFICATION forming part of Letters Patent No. 501,671, dated July 18, 1893.

Application filed September 29, 1892. Serial No. 447,286. (No model.)

*To all whom it may concern:*

Be it known that I, GERARD BEEKMAN, a citizen of the United States, residing in the city, county, and State of New York, have invented certain new and useful Improvements in Picker-Actuating Mechanism for Cotton-Harvesters, of which the following is a specification.

My invention relates to the character of picker described in my separate patent application, Serial No. 389,932, filed April 22, 1891; also in my separate patent application filed simultaneously herewith, Serial No. 447,285, wherein rotary flexible stems are employed to seize the cotton, and are projected in groups on subordinate oscillatory supports attached to a main rotary support by the orbital rotation of which the said pickers are moved backward in contact with the plants at substantially the same rate of speed as the motion of the harvester forward over the ground.

The object of my said invention is to minimize the number of parts, and the frictional resistance of the apparatus for revolving the pickers; and said invention consists in various novel features of construction pertaining to the character of said mechanism hereinafter fully described and pointed out in the appended claims.

Figure 3:
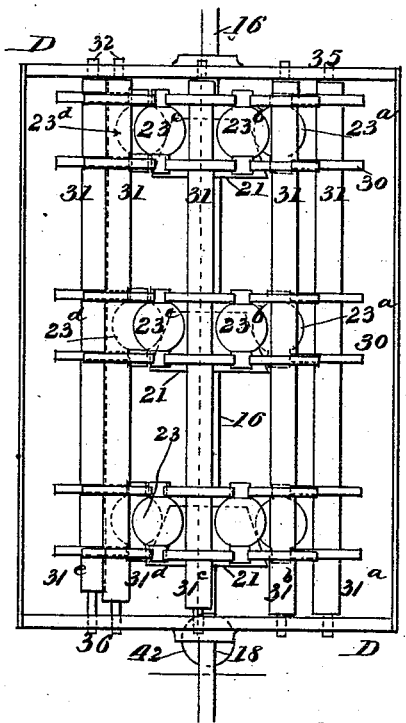
Figure 4:
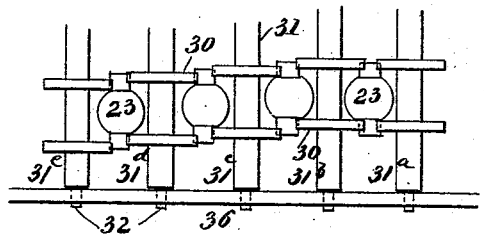
Figure 5:
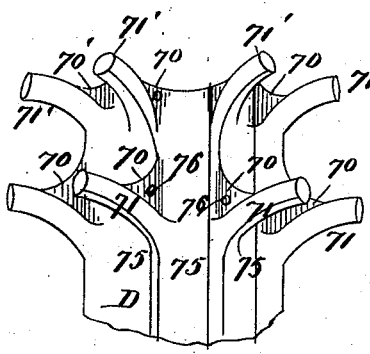
Figure 6:
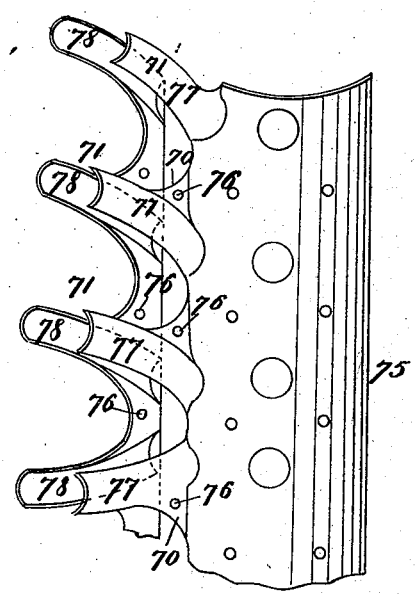
Figure 7:
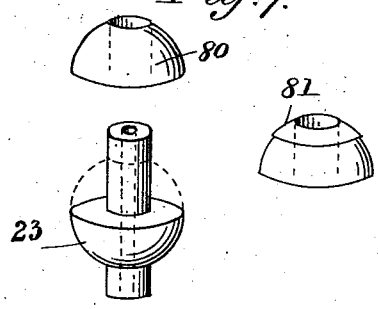
Figure 8:
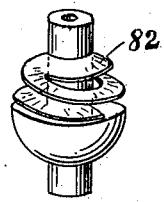

Referring to the accompanying drawings: Figure 1, is a sectional elevation of the subordinate oscillatory support; Fig. 2, a horizontal section of Fig. 1, taken on the line $y—y$. Fig. 3, is a front elevation of the interior mechanism in Figs. 1, and 2; the outer case being removed. Fig. 4, is a detail view, showing the lower part of Fig. 3, in diagrammatic projection; the parts appearing in a different position. Fig. 5, is a partial front elevation of the case of the subordinate support. Fig. 6, is a detail perspective view showing the construction of such case or shell. Figs. 7, and 8, are detail views showing in perspective certain modifications in the construction of the bobbins 23. Fig. 9, is a sectional elevation of the subordinate oscillatory support, and modified mechanism therein; and Fig. 10, a horizontal section taken on the line $y'—y'$, Fig. 9.

The main rotary support B, is composed of a trifurcated frame having depending arms, one of which is indicated at 8. Several subordinate supports such as D, are attached to oscillate freely on vertical axes formed by the picker driving shafts composed of sections 13, 16, 17, &c., in the arms 8. The springs 26', act torsionally between the arms 8, of the frame B, and the oscillatory supports D, in the axes of the latter, and tend to revolve such supports in opposition to the direction of oscillation which the shaft 13, 16, 17, tends to impart. The springs 26', also tend to expand longitudinally and depress the supports D, for purposes hereinafter stated. The main support B, is rotated in a direction corresponding to the passage of the plants, at such speed as to move the picking stems 22, backward in contact with said plants at substantially the same rate of speed as the motion of the harvester forward over the ground. As the members 8, of the rotary frame B, are successively revolved past the cleaning device for removing the cotton from the picking stems, the shafts 13, 16, 17, are depressed, with the design of causing the said picking stems to temporarily cease their spinning motion, while being stripped. The shafts 16, carry frictional driving rollers 21, constructed in the form of truncated cones, which frictionally engage upon the spherical portion of the bobbins 23, carrying the picking stems 22. The bobbins 23, have reduced extensions as indicated, bearing on the flanges 30, of the tubular spindles 31, that rotate freely upon rods 32, fixed in plates 35, 36, of the supports D. The bobbins 23, are each supported between three rotary parts 21, 30, 30, upon their peripheries as will be seen by an inspection of Fig. 2, so as to sustain them in place, avoiding the use of stationary bearings.

The frictional driving rollers 21, may be provided with elastic surfaces in order to equalize their contact with each bobbin 23, of a vertical series, which are supported by the pairs of flanges 30, of each vertical spindle 31, at distances which may vary or become varied with continued use and wear. The support D, with its plates 35, 36, is vertically movable on the shaft 16. The compression and torsional spring 26', is interposed between the plate 35, and the frame B.

42, is an anti-frictional roller by which the support D, is sustained so as to permit its oscillatory motions on the smooth surface 43, when the shaft 16, has been depressed.

As illustrated in Figs. 3, and 4, the spindles 31, may be made of different lengths, the same decreasing in length from those spindles 31ª, 31ᵇ, supporting the pickers that first touch the cleaning brush to those 31ᶜ, 31ᵈ, 31ᵉ, that support the pickers having last contact. Those spindles having shorter lengths than the distances between the plates 35, 36, are permitted to slide freely upon the rods 32. The bobbins 23, have a certain amount of vertical play between the flanges 30, of the spindles 31, whereby to permit a limited range of independent vertical motion of the latter when the shaft 16, is depressed.

In order that the spindles 31, may, when the shaft 16, is raised, support the frame D, so that the weight of the latter and the pressure of the spring 26', may be evenly transmitted and distributed so as to keep all the bobbins 23, in frictional contact with the rollers 21, elastic upper portions 80, Fig. 7, composing a part of each bobbin are interposed between the flanges 30, of the spindles and the lower portions of the bobbins. These elastic upper portions 80, may be further provided with metal washers 81, Fig. 7, to receive the pressure of the spindles.

Metal springs 82, may be substituted for the elastic pieces 80, as in Fig. 8.

In Figs. 9, and 10, the successive arrest of each vertical series of pickers is provided for through the agency of depending shanks 80ª, having at one end collars slipped loosely over the rods 32, and at the other end projections passing through suitable holes in plate 36. The depending shanks 80ª, are adapted to rest on the roller 81', upon the frame 8, when the support D, descends. As seen in Fig. 10, the shanks 80ª, of the spindle 31, touch the roller 81', one at a time successively, when the support D, oscillates about the shaft 16, while the latter is depressed, the shanks not in touch being indicated at 80ᵇ. Springs 82', are interposed between the said spindles 31, and the plate 35, the combined resilient strength of which carries the weight of the shell D, and pressure of the spring 26' when the shaft 16, is raised.

The operation, referring to Figs. 1, and 2, is as follows: When the frame B, is rotated, and the machine advances, the oscillatory supports D, tend to project the picking stems 22, in a direction opposite to the progress of said supports in the orbit through which they circulate. This occurs by reason of the frictional resistance of the bobbins 23, on the wheels 21, prevailing over the torsional power of the springs 26', while such wheels are in transmitting contact. The pickers enter the plants, and after extracting the cotton with which they come in contact, pass to a position at which they trail out from the branches of the plant during the work of extraction, and subsequently remain in such trailing position by reason of the aforesaid frictional resistance of the transmitting mechanism, until at a position approaching the cleaning brush. The oscillatory support D, is then permitted to descend; the gravity of the said support and its shafting, together with the expansion of the spring 26', assisting in producing the depressing motion. As soon as the support D, has descended sufficiently to rest by its roller 42, upon the surface 43, in the arm 8, such support D, is arrested from farther descent, and as the shaft 16, continues to be depressed, the conic rollers 21, are separated from the bobbins 23, or tend to separate, so that such bobbins are relieved of compression between the rollers 21, and the flanges 30, and rotation ceases to be transmitted to the picking stems 22. The rotative frictional resistance of transmission being thus relieved, the springs 26', operate torsionally to throw the oscillatory support D, with its picking stems, suddenly forward in rotation about shaft 16, so as to bring each vertical series of picking stems 22, in contact with the cleaning brush in rapid succession. The sudden oscillatory motion of said support thus described is imparted for the purpose of minimizing the liability of the extracted cotton to drop off from the stems when arrested; the cotton being brought as quickly as possible to the brush after the said arrest occurs. As soon as the stems 22, have passed the brush, they are again put in motion by raising the shaft 16, and the operation is repeated. During the transmission of rotative motion from the driving rollers 21, to the bobbins 23, in the position shown in Fig. 1, the combined weight of the support D, and its mechanism, and the longitudinal expansion of the spring 26', is utilized to press the bobbins 23, against the tapered surfaces of the said rollers 21, insuring sufficient frictional contact to continuously rotate the stems 22, while the cotton is being extracted from the plant.

A successive stoppage of the spindles 31, and bobbins 23, may be effected by means of the differential lengths of the said spindles in the following manner, Figs. 3, and 4: When the shaft 16, is depressed, at the time the support D, approaches the cleaning brush, the spindles 31ª, 31ᵇ, are first arrested in descent with the arrest of the vertical motion of the frame D, when the roller 42, touches the frame 8. The series of bobbins 23ª, are thereby released from the rollers 21, first, and the remaining series of bobbins 23ᵇ, 23ᶜ, 23ᵈ, continue to revolve with sufficient force to keep the stems 22, that are free in motion and prevent the cotton suspended thereon from falling. The weight of the spindles 31ᶜ, 31ᵈ, 31ᵉ, on the bobbins 23ᵇ, 23ᶜ, 23ᵈ, should be sufficient to thus revolve the pickers when the said spindles are relieved from contact with plate 35, of the support D. On continued descent of the shaft 16, the spindles 31ᵇ, 31ᶜ, 31ᵈ, successively touch the plate 36, owing to their differential lengths and successively release the remaining series of bobbins 23ᵇ, 23ᶜ, 23ᵈ, corresponding to the time that their respective picking stems arrive in contact with the cleaning brush. Thus every set of the vertical series of stems 22, are kept revolving, until the cotton thereon is seized by the brush. This action may be assisted by interposing springs between the plate 35 and the upper ends of the spindles 31.

The operation, referring to Figs. 9, and 10, is as follows: When the shaft 16, is raised, the weight of the support D, and of the main spring 26', pushes the plate 35, downward against the subordinate springs 82', which transmit the pressure through the bobbins 23, to the rollers 21, thus insuring frictional contact. When in the course of the descent of the shaft 16, any one shank 80ᵃ rests upon the wheel 81', the subordinate spring 82', attached to the upper end of the corresponding rod 32, is compressed by reason of the superior strength of the main spring 26', and the weight of the support D, over the strength of any one subordinate spring 82'. The contraction of this single subordinate spring permits the rise of its corresponding spindle 31, and the consequent relief from frictional contact between the corresponding bobbins 23, 23, and the roller 21. It will thus be seen that the weight of the support D, always rests upon the rollers 21, through the agency of all the bobbins 23, spindles 31, and subordinate springs 82', with the exception of the single vertical set of bobbins 23, and idle spindle 31, acted upon by the shank 80ᵃ, in contact with the stationary wheel 81'.

It will be observed that the conic character of the rollers 21, and the spherical character of the bobbins 23, are adapted to take up wear and avoid frequent repairs or replacement of the rolling parts.

The frictional resistance of the bobbins 23, opposing the torsional action of the spring 26', contributes to the delicate counterbalancing of the oscillatory motion of the subordinate support D, permitting the branches of the cotton plant to easily control the position of said support by contact with the arms 25, and pickers 22.

Webs 70, are provided to fill the acute angular spaces between the rigid tubes 71, of the shells of the supports D, which tubes embrace the flexible coiled wire arms 25. These webs are situated above and below the tubes 71, upon all except the extreme upper and lower ones 71', which, as seen in Fig. 5, are webbed crosswise at 70', in a horizontal series so as to fill the spaces between them. The object of such webs is to prevent the bolls of cotton or the divergent branches of the cotton plant from becoming entangled and caught between the arms 71, or 71', as the machine progresses.

The shells 75, of the supports D, are constructed, as more clearly appears in Figs. 2, and 6, of vertical plates overlapping each other and riveted or otherwise fastened together in the manner indicated. The tubes 71, are composed of two halves 77, 78; the corresponding halves being united in vertical series as seen in Fig. 6; one-half of the series 77, projected from the outer vertical edges of the overlapping plates constituting the shell 75, while the other half of the series 78, is united to said plates by means of screws inserted in the webs 70, at 76. Thus any vertical series of tubes 71, may be opened for access to the pickers without taking the sheet 75, apart, by taking off part of a series 78, from the other part 77, leaving a composite shell 75, to protect the bobbins and actuating machinery. This structure enables the shell to be composed of material light enough to be stamped into shape in a die and the ready removal and renewing of the elastic tips or arms 25.

Having thus fully described my invention, what I claim, and desire to secure by Letters Patent, is—

1. The combination in a cotton harvester, of a main rotary support, a subordinate support, a rotary picking stem and a bobbin thereon in the said subordinate support, a longitudinally movable driving shaft in said subordinate support, a tapered driving roller on the shaft engaging with the bobbin, and means for holding the said subordinate support and the bobbin longitudinally in place when the said driving shaft is moved longitudinally, for the purpose set forth.

2. The combination in a cotton harvester, of a main rotary support, a subordinate support, a rotary picking stem and bobbin thereon, a longitudinally movable driving shaft extending vertically in the said subordinate support, a tapered driving roller on the said shaft engaging with the said bobbin, and means for maintaining the said bobbin in a longitudinally given position in said subordinate support, the weight of the said support, pickers, and bobbins being sustained by the bearing of the latter on the tapered driving wheels when the driving shaft is raised, and an independent means for sustaining the weight of said parts when the driving shaft is depressed, substantially as and for the purpose described.

3. The combination in a cotton harvester, of a main rotary support, a subordinate oscillatory support, a rotary picking stem and bobbin thereon in the subordinate support, a vertical longitudinally movable driving shaft bearing a tapered driving roller engaging with said bobbin and forming the axis of oscillation of said subordinate support; the latter being longitudinally movable with reference to the said shaft; and a torsionally and longitudinally resilient spring interposed between the main support and the subordinate support in the axis of oscillation of the latter, for the purpose described.

4. The combination in a cotton harvester, of a suitable support, a rotary picking stem, a spherical bobbin thereon having reduced extensions as described, two pairs of idle flanges 30, 30, engaging with the said reduced extremities of each bobbin, and bearing upon the spherical portion of each bobbin a tapered frictional driving roller, means for actuating the same, and means for engaging and disengaging said bobbin and driving roller by a longitudinal movement of one relatively to the other.

5. The combination in a cotton harvester, with a suitable support, a tapered frictional driving roller and a flanged idle spindle having a longitudinal movement, of an elastic bobbin bearing a picking stem; the said bobbin adapted for limited longitudinal compression for the purpose described.

6. The combination in a cotton harvester, with a suitable support and driving shaft, longitudinally movable, the one with reference to the other, of a tapered frictional driving roller on said shaft, a series of flanged idle spindles mounted within the support, and a series of bobbins bearing picking stems, interposed between said spindles, and tapered rollers, dependent for their rotation upon the longitudinal compression of the said support with reference to the driving shaft, for the purpose described.

7. The combination in a cotton harvester, of a suitable support, a tapered driving roller, and means for displacing the same longitudinally, a circular series of bobbins resting thereon, and flanged spindles supporting and resting on the bobbins having variable distances of longitudinal displacement within said support, substantially as and for the purpose described.

GERARD BEEKMAN.

Witnesses:
EUGENE LUCAS,
H. F. PARKER.